United States Patent [19]

Voigt

[11] Patent Number: 5,662,290
[45] Date of Patent: Sep. 2, 1997

[54] MECHANISM FOR THRUST VECTOR CONTROL USING MULTIPLE NOZZLES

[75] Inventor: Che-Ram S. Voigt, Geyserville, Calif.

[73] Assignee: Versatron Corporation, Healdsburg, Calif.

[21] Appl. No.: 679,849

[22] Filed: Jul. 15, 1996

[51] Int. Cl.⁶ .............. F42B 10/66; B05B 12/00; F02K 9/80
[52] U.S. Cl. ............ 244/3.22; 244/3.21; 239/265.35; 60/232
[58] Field of Search .............. 244/3.21, 3.22, 244/3.23, 3.24; 102/374; 114/23; 60/232; 239/265.35

[56] References Cited

U.S. PATENT DOCUMENTS

| 2,850,977 | 9/1958 | Pollak | 244/3.22 |
|---|---|---|---|
| 3,200,586 | 8/1965 | Ernest . | |
| 3,200,587 | 8/1965 | Tolson . | |
| 3,786,993 | 1/1974 | Burgess et al. . | |
| 3,986,683 | 10/1976 | Ellison . | |
| 4,029,270 | 6/1977 | Niemeier | 244/3.21 |
| 4,163,534 | 8/1979 | Seeger | 244/3.22 |
| 4,272,040 | 6/1981 | Bastian et al. | 244/3.22 |
| 4,560,121 | 12/1985 | Terp | 244/3.22 |
| 4,892,253 | 1/1990 | Speicher et al. . | |
| 5,123,611 | 6/1992 | Morgand | 244/3.22 |
| 5,505,408 | 4/1996 | Speicher et al. . | |

Primary Examiner—Charles T. Jordan
Assistant Examiner—Theresa M. Wesson
Attorney, Agent, or Firm—Henry M. Bissell

[57] ABSTRACT

An interface yoke plate is employed to impart directional control of multiple rocket nozzles. The interface yoke plate is rotated and translated in two orthogonal directions in accordance with steering commands from the missile autopilot and effects control along the yaw, pitch, and roll axes of the missile. One actuator yoke plate translates the interface yoke plate along one axis while another actuator yoke plate translates the interface yoke plate along a second axis. The interface yoke plate may also be rotated by one or both actuator yoke plates, causing a relative twisting of the multiple rocket nozzles and thereby directing their thrust in opposing directions and inducing a roll motion of the missile.

22 Claims, 5 Drawing Sheets

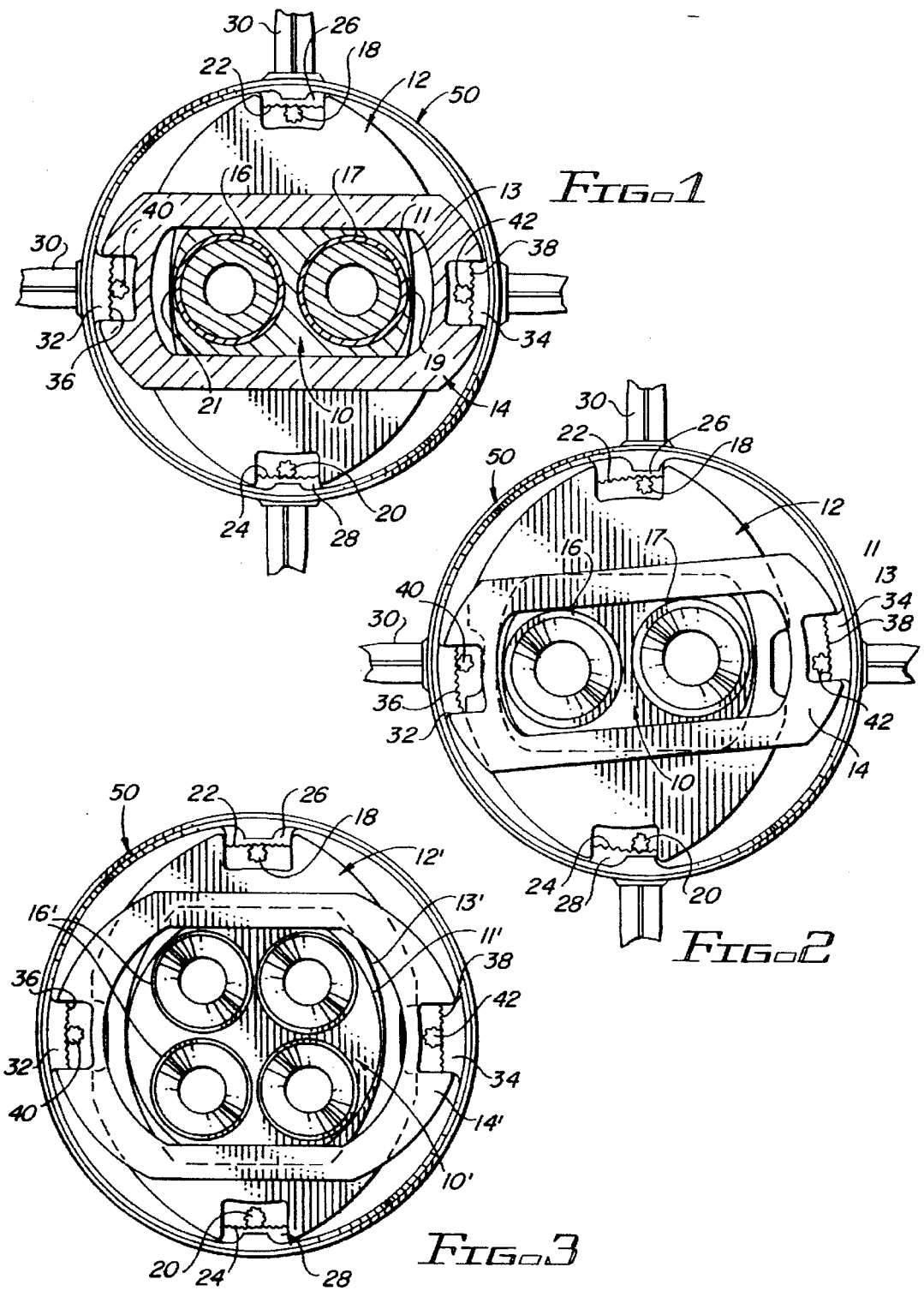

MECHANISM FOR THRUST VECTOR CONTROL USING MULTIPLE NOZZLES

BACKGROUND OF THE INVENTION

1. Field of the Invention

The invention relates to the steering control of rocket propelled vehicles by the use of thrust direction control or a combination of thrust direction control and steering fin control.

2. Description of the Related Art

As military aircraft become faster and more maneuverable, there is an increased need for faster and more maneuverable missiles with longer ranges to counter these threats. One method of increasing maneuverability of a missile is to use a steerable nozzle on the rocket motor to allow the direction of thrust to be controlled. This affords greater maneuverability than traditional movable aerodynamic fins alone can provide under low speed or very high altitude when the dynamic pressure is low.

The mechanism used to move the steerable nozzle is known as the nozzle actuator system. Such a system is disclosed in U.S. Pat. No. 5,505,408 of John M. Speicher, Allan A. Voigt and Che-Ram S. Voigt, assigned to the same assignee as the instant application. The disclosure of that patent is incorporated herein by reference. That system has a pair of orthogonal yoke plates used to direct a rocket nozzle in accordance with steering commands of the missile control system. The yoke plates are coupled to the rocket nozzle, which is pivoted for movement at a ball-and-socket type joint, such that their translation in their prescribed planes moves the rocket nozzle to effect directional control of the rocket thrust.

A shortcoming of the prior art is that, although thrust direction control may provide adequate control of the missile along the yaw and pitch axes, motion along the roll axis must still be effected through the use of the missile aerofins. A problem arises at high altitudes, however, under conditions of low dynamic pressure, such as high angles of attack and low speeds, which significantly reduce the effectiveness of the aerofins. This reduces roll motion control and compromises the stability and maneuverability of the rocket.

Attempts to obviate problems with reliance on aerofins for roll motion control have included the use of a plurality of rocket nozzles. Such a system is disclosed in U.S. Pat. No. 3,200,586. The need to independently control the rocket nozzles in such a system, however, detracts from its practicability by adding additional weight and expense and reducing the reliability of the rocket.

Other systems, such as those disclosed in U.S. Pat. Nos. 3,786,993 and 3,986,683, have used a single nozzle in conjunction with movable tabs disposed in the exhaust stream. However, in addition to increasing costs, these systems also introduce drag, which results in a host of attendant complications.

U.S. Pat. No. 3,200,587 discloses still another system which provides attitude control of a rocket vehicle by shifting the nozzle transversely so that the thrust axis is no longer coincident with the central axis of the vehicle, thereby developing steering torque.

SUMMARY OF THE INVENTION

In brief, particular arrangements in accordance with the present invention resolve the deficiencies of the prior art by providing a simple mechanism for thrust direction control of multiple rocket nozzles. Rather than actuating the multiple rocket nozzles independently, the nozzles are moved in unison, enabling roll control which is immune from the low dynamic pressure limitations imposed by aerofin use without introducing the weight and expense problems associated with independent control of the multiple rocket nozzles. This thrust direction control can be used in lieu of, or in conjunction with, aerofins to effect steering of the missile.

In a preferred embodiment, movement of the rocket nozzles is controlled by an interface yoke plate surrounding the nozzles. The interface yoke plate is coupled to first and second actuator yoke plates mounted for motion in planes transverse to the missile axis.

Motion of the first and second actuator yoke plates is effected through a pair of rack and pinion gear assemblies disposed at peripheral ends of each actuator yoke plate. The rack of each assembly is mounted on a carrier which translates along a circumferential path with rotation of the pinion gear, which is controlled by motion commands issued by the missile autopilot.

As the carriers translate, the actuator yoke plates, to which they are slidably engaged, are moved in their mounting planes. This motion, depending on which carrier is moved and in which direction, results in any of a combination of movements of the actuator yoke plates, which in turn re-positions the interface yoke plate and orients the rocket nozzles for the desired thrust direction.

According to the invention, thrust in the yaw direction is achieved by displacing the interface yoke plate and nozzles along the missile yaw axis. Similarly, thrust in the pitch direction is accomplished by displacing the interface yoke plate and nozzles along the pitch axis.

A significant feature of this invention is that, to effect roll motion of the missile, the interface yoke plate is rotated by the actuator yoke plates, directing the nozzles, by a relative twisting action, in different directions. This produces a roll moment in a simple and effective manner.

Another significant feature of the invention lies in the fact that the rotation of the interface yoke plate can be achieved through rotation of either the first or second actuator yoke plate, with the rotation of the interface yoke plate being decoupled from the other actuator yoke plate. This also works to enhance the simplicity of the design by dispensing with the need to align and synchronize the rotational movement of the first and second actuator yoke plates.

DESCRIPTION OF THE DRAWINGS

A better understanding of the present invention may be realized from a consideration of the following detailed description, taken in conjunction with the accompanying drawings, in which:

FIG. 1 is a schematic sectional view of one particular arrangement of the invention, taken from the aft end looking forward and showing the juxtaposition of the interface yoke plate between first and second actuator yoke plates;

FIG. 2 is a schematic view of the arrangement of FIG. 1, showing displacement of the actuator yoke plates to develop a rotational motion juxtaposed on a yaw axis motion of the interface yoke plate;

FIG. 3 is a schematic view of a second particular arrangement of the invention, illustrating the control of four nozzles instead of two.

FIGS. 5 through 10B are taken from the drawings of U.S. Pat. No. 5,505,408, corresponding to FIGS. 1 through 6B thereof, and are included with FIGS. 1–4 herein and the corresponding description from that prior patent in order to enhance the understanding of the apparatus of the present invention, as particularly depicted in FIGS. 1–4.

FIG. 5 is a schematic perspective view, partially broken away, illustrating one particular prior art arrangement;

FIG. 6 is a side-sectional view of the arrangement of FIG. 1, taken along line 6—6 thereof and showing certain structural details;

FIG. 7 is a schematic view showing the mounting of a single aerofin on a missile housing;

FIG. 8 is a schematic cross-sectional view showing the general orientation of aerofins and yoke plates in a typical arrangement in accordance with the present invention;

FIG. 9 is a schematic side view, partially broken away, showing some of the details of the internal drive mechanism employed in arrangements such as FIG. 8; and FIGS. 10A and 10B are schematic end views depicting the orientation of the yoke plates to different positions of the associated drive gears.

DETAILED DESCRIPTION OF THE PREFERRED EMBODIMENTS

Figure 4:
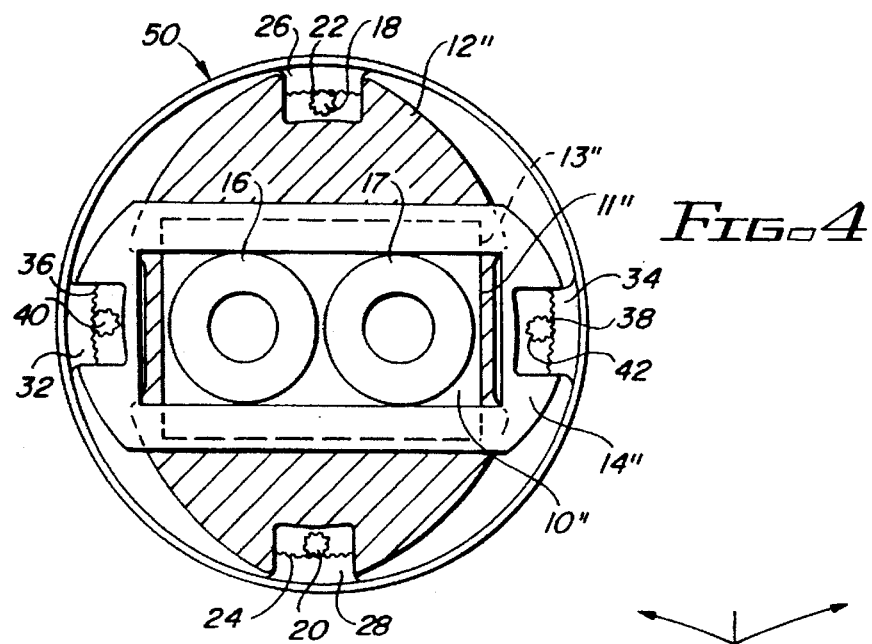
FIG. 4 is a schematic view of another arrangement of the invention, in which the interface yoke plate is provided with four flats in place of the arcuate bearing surfaces in the arrangement of FIGS. 1 and 2.

FIGS. 1 and 2 show one particular nozzle actuator system of a missile 50 in accordance with the invention. The actuator system has a first actuator yoke plate 12, a second actuator yoke plate 14, and an interface yoke plate 10. Actuator yoke plate 12 is slidably mounted on translating carriers 26 and 28, which carriers are provided with rack gears 22 and 24 engaging pinion gears 18 and 20, respectively. Actuator yoke plate 14 is slidably mounted on translating carriers 32 and 34, which are in turn provided with rack gears 36 and 38 engaging pinion gears 40 and 42, respectively.

Carriers 26, 28, 32, and 34 travel along a circumferential path inside the skin of missile 50 when their associated pinion gears are rotated against the rack gears. Rotation of the pinion gears is carried out in accordance with commands from the missile autopilot during missile flight.

Interface yoke plate 10 is disposed between actuator yoke plates 12 and 14, extending into the openings therein. Translation or rotation of one or both actuator yoke plates 12, 14 is transferred to similar motion of interface yoke plate 10, which operates to move rocket nozzles 16 and 17 accordingly.

To achieve thrust in the yaw direction, which is the left-right direction of the drawing figures, pinion gears 18 and 20 are rotated counterclockwise and clockwise, respectively. This causes carriers 26 and 28 to slide to the left, displacing actuator yoke plate 12 to the left. Interface yoke plate 10 is similarly displaced to the left by virtue of its contact with actuator yoke plate 12 at contact surfaces 19, 21, thereby directing rocket nozzles 16 and 17, which are pivotally mounted at their bases by a ball-and-socket joint as discussed in U.S. Pat. No. 5,505,408, to produce thrust in the yaw direction.

Thrust in the pitch direction, which is the up-down direction of the drawing figures, is accomplished by similar motion in the pitch direction of carriers 32 and 34, actuator yoke plate 14, and interface yoke plate 10.

In order to impart roll motion to missile 50, nozzles 16 and 17 are configured to produce thrust vectors at varying angles relative to the missile axis. This is accomplished by rotating interface yoke plate 10 to thereby produce a relative twist of the pivoted nozzles 16 and 17. For example, counterclockwise rotation of interface yoke plate 10 deflects left nozzle 16 downward and right nozzle 17 upward, resulting in a roll moment on missile 50. FIG. 2 illustrates this rotation, which is juxtaposed on a yaw displacement of the nozzles 16 and 17. Thus both a yaw and roll motion are achieved simultaneously, a particularly advantageous feature in situations of a high attack angle with low dynamic pressure, where missile aerofins are least effective.

Roll motion can also be juxtaposed on pitch motion, with actuator yoke plate 14 acting to displace interface yoke plate 10 in the pitch direction while interface roll plate 10 is rotated.

The rotation of interface roll plate 10 is accomplished through the rotation of yoke plate 14. By turning both pinion gears 40 and 42 in the same direction, carriers 32 and 34 are driven in opposite directions, imparting a rotational motion to actuator yoke plate 14. To facilitate rotation, side edges 11 of interface yoke plate 10 are curved and engage curved interior edges 13 of actuator yoke plate 12. The curvature of edges 11 and 13 is matched so that upon rotation of interface yoke plate 10, edges 11 remain in contact with edges 13. However, the rotational motion of interface yoke plate 10 is decoupled from actuator yoke plate 12, and only the rotation of one actuator yoke plate, actuator yoke plate 14, is required to impart the rotational motion of interface yoke plate 10. In this way, only the translational motion of interface yoke plate 10 is coupled to yoke plate 12, while rotational motion is decoupled therefrom.

Alternatively, as shown in FIG. 4, edges 11" and 13" of interface yoke plate 10" and actuator yoke plate 12", respectively, can be provided as flats. This would not decouple the rotational motion of the interface yoke plate 10" and actuator yoke plate 12", and would require the coordinated rotation of both actuator yoke plates 12" and 14" in order to effect rotation of interface yoke plate 10" to yield a roll moment.

The instant invention is not limited to the two nozzles of FIG. 1, but can be applied in principle to any number of pivoted nozzles. As seen in FIG. 3, for example, four nozzles 16' are provided for actuation by the nozzle actuator system. Interface yoke plate 10', which surrounds and directs the movement of the nozzles 16', is rotated or translated in two orthogonal axes by actuator yoke plates 12' and 14'. Movement of actuator yoke plates 12' and 14' is effected by carriers 26, 28, 32, and 34 via corresponding rack and pinion gear assemblies 18, 22, 20, 24, 40, 36, 42, and 38 in the manner set forth above. Rotation of interface yoke plate 10' as imparted by actuator yoke plate 14' would also provide the relative twisting of the nozzles 16' to achieve a roll moment.

FIGS. 5 through 10B are taken from the aforementioned U.S. Pat. No. 5,505,408 of Speicher et al. These views are included to illustrate the background and general layout of arrangements similar to those of the present invention. Embodiments depicted in FIGS. 1–4 are designed for use in missile systems having pivotable propulsion rocket nozzles similar to that of FIG. 6, for example. FIGS. 7–10B depict similar yoke plate arrangements, different from that of FIGS. 5 and 6, and a thrust vector control (TVC) system in conjunction with an aerofin control system for enhanced control and maneuverability of an associated missile.

Figure 5:
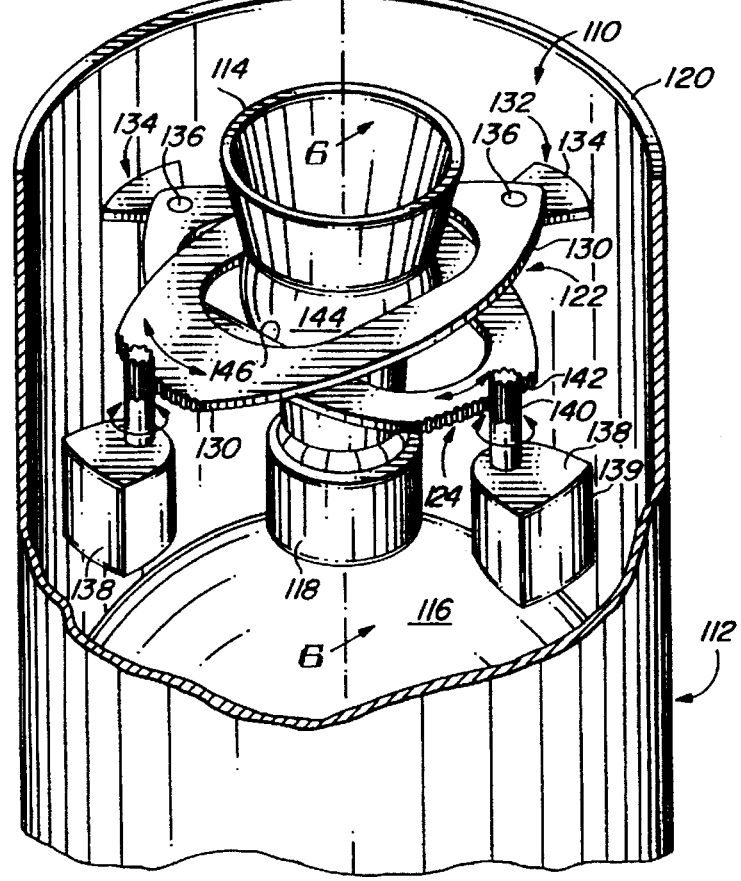

As shown particularly in the schematic view of the prior art arrangement of FIG. 5, the nozzle actuation system 110 is shown in conjunction with a missile 112 having a steerable nozzle 114 mounted to a rocket motor 116 via a ball and socket joint 118, and an encompassing skin 120 which is partially broken away to show details of the steering arrangement therein. The nozzle actuation system 110 comprises a pair of nozzle actuators 122, 124 which are oriented orthogonally from each other in adjacent planes which are generally transverse to the missile central axis to effect steering of the nozzle 114 relative to two orthogonal "A" and "B" axes, respectively. Thus, the actuator system 110 is able to drive the nozzle 114 about the two orthogonal axes A and B for omni-directional steering.

Each of the individual actuators 122, 124 includes a yoke plate 130 and anchoring means at opposite ends of the yoke plate for anchoring the actuator to the missile skin 120. At one end of each yoke plate 130, the anchoring assembly 132 comprises an anchor 134 which is affixed to the inner surface of the skin 120 and serves as a pivot mount for the yoke plate 130 via a pivot pin 136.

At the opposite end of each yoke plate 130, the anchoring arrangement comprises a gear motor 138 contained in a housing 139 which is affixed to the inner surface of the skin 120. Projecting from the housing 139 is a shaft gear 140 which is adapted to engage the adjacent end of the yoke 130 which is fashioned with gear teeth comprising part of a sector gear 142.

Completing the actuation system 110 of FIG. 5 is a yoke seat 144 which is mounted circumferentially about the nozzle 114 within the openings of the elongated yoke plates 130. The yoke seat 144 is formed as a segment of a sphere to provide sliding contact points, such as at 146, to support the bearing loads generated by the yoke plates 130. The seat 144 is spherically cut and has a center on the nozzle center line at a point approximately in line with the central plane between the two yoke plates 130.

Each yoke plate has an elongated central opening defined by two arms which extend about the nozzle. These arms have bearing surfaces adjacent the nozzle yoke seat for transmitting lateral forces to the nozzle 114 while permitting sliding contact with the yoke seat 144.

Figure 6:
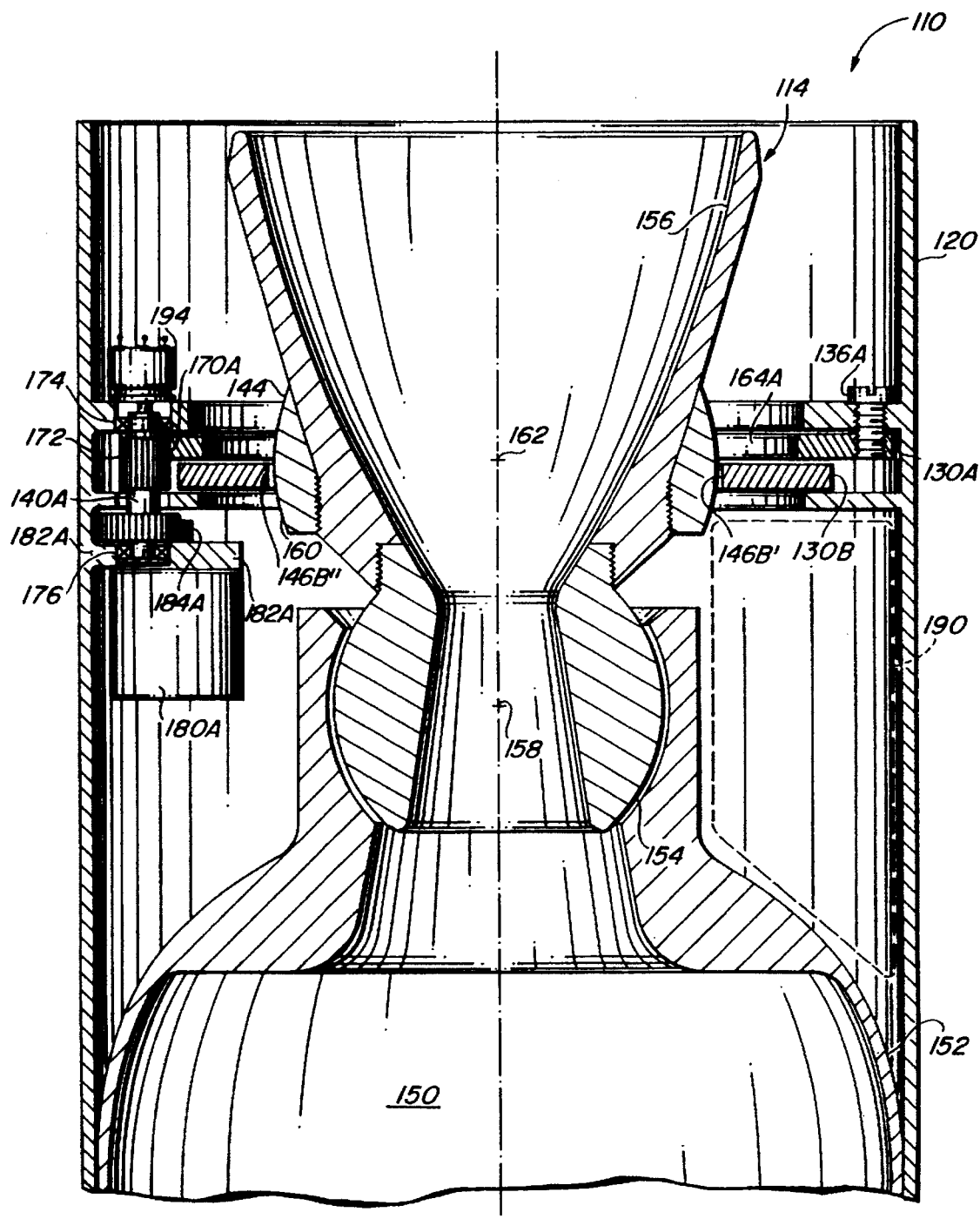

FIG. 6 illustrates particular structural details of the nozzle system 110 of FIG. 5. A generic rocket motor is pictured having a pressure vessel volume 150 and an aft closure 152 which contains the socket for a spherical ball and socket pivot 154. The nozzle exit cone 156 of nozzle 114 is attached to the ball portion of the pivot 154 such that the exit cone 156 is constrained to rotate with three degrees of freedom about a point 158 in the center of the ball and socket pivot 154.

The spherically cut surface 160 of yoke seat 144 is threadably mounted to the outside of the nozzle 114. The surface 160 affords a suitably strong seat for contact with the two yoke plates 130A, 130B at four points. Two of these points are indicated at 146B' and 146B" in FIG. 6 for the yoke plate 130B. The yoke seat 144 is spherically cut about a point 162 located along the center line of the exit cone 156 and nominally on a plane midway between the two yoke plates 130A, 130B. Forces transmitted through the points of contact between the yoke plates 130A and 130B and the yoke seat 144 generate torque which drives rotation of the nozzle 114 about the A and B axes.

The A-axis actuator 122 comprises yoke plate 130A which is attached to the missile skin structure 120 through a pivot pin 136A. The yoke plates 130A, 130B are constrained to move in planes about their respective pivot pins 136 by the surrounding structure—i.e., the skin structure 120 fore and aft—as they are driven by the gear motor arrangement 138. Each yoke plate 130A, 130B contains an elongated slot 164A or 164B. The yoke seat 144 lies within the slots 164A, 164B and makes contact at two points on opposite sides of each of the yoke plates 130A, 130B. The slots 164A, 164B and seat 144 are cut for a slight clearance, so that the yoke plates 130A, 130B are not actually in contact with the seat at both contact points at the same time, but rather will contact one point or the other depending upon the direction of applied forces. Each yoke plate 130A, 130B has gear teeth 170A or 170B cut into the plate at one end to establish a sector gear portion which is driven by a cluster shaft pinion 172 (FIG. 6). The cluster shaft is mounted by bearings 174, 176 to the missile skin structure 120. The A-axis drive motor 180A is mounted on tabs 182A of the missile skin structure 120. The motor shaft pinion 184A drives the cluster shaft 140A. Clearance slots are cut into the yoke plates 130A, 130B to allow long rotation of the yoke plates without interference from the other axes cluster pinions 172.

The B-axis drive is essentially identical to the A-axis drive. The B-axis yoke plate 130B is positioned next to, but in front of, the A-axis yoke plate 130A. Its pivot pin 136B is similarly attached to the missile structure 120, and yoke plate 130B has sector gear teeth 170B driven by an engaged pinion 172 on shaft 173.

Figure 7:
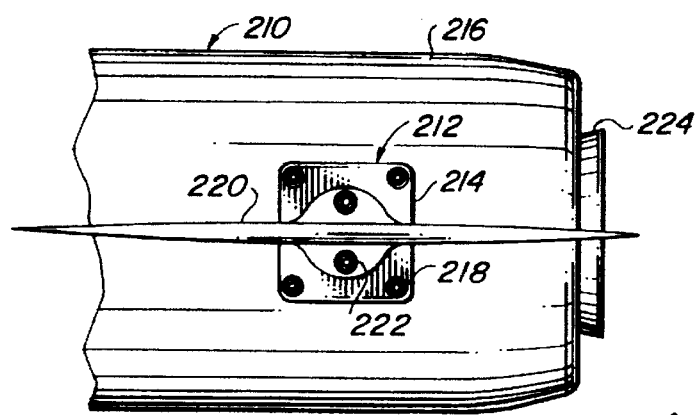

FIG. 7 is a schematic diagram representing a missile 210 with an aerofin assembly 212 installed thereon. The assembly 212 comprises an aerofin 220 pivotably installed on a base plate 214 which is secured to the skin 216 of the missile 210 by means of mounting bolts 218. The aerofin 220 is affixed to an internal drive mechanism by mounting bolts 222. The exhaust nozzle of the missile 210 is represented schematically at 224. The pivotable mounting of the nozzle 224 corresponds to that which is shown in FIGS. 5 and 6.

Figure 8:
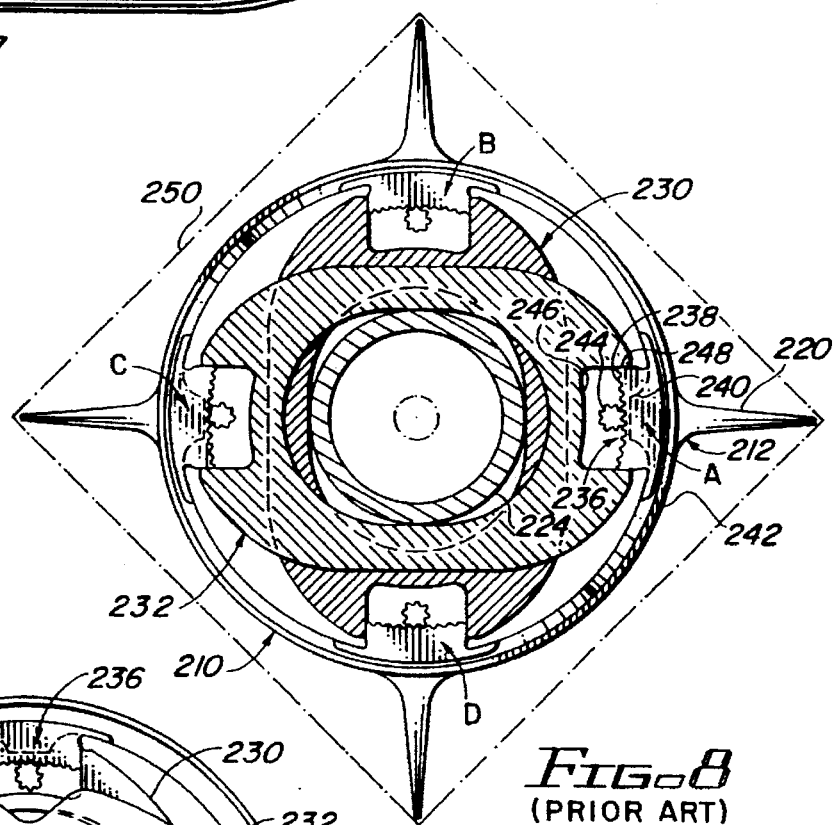
Figure 9:
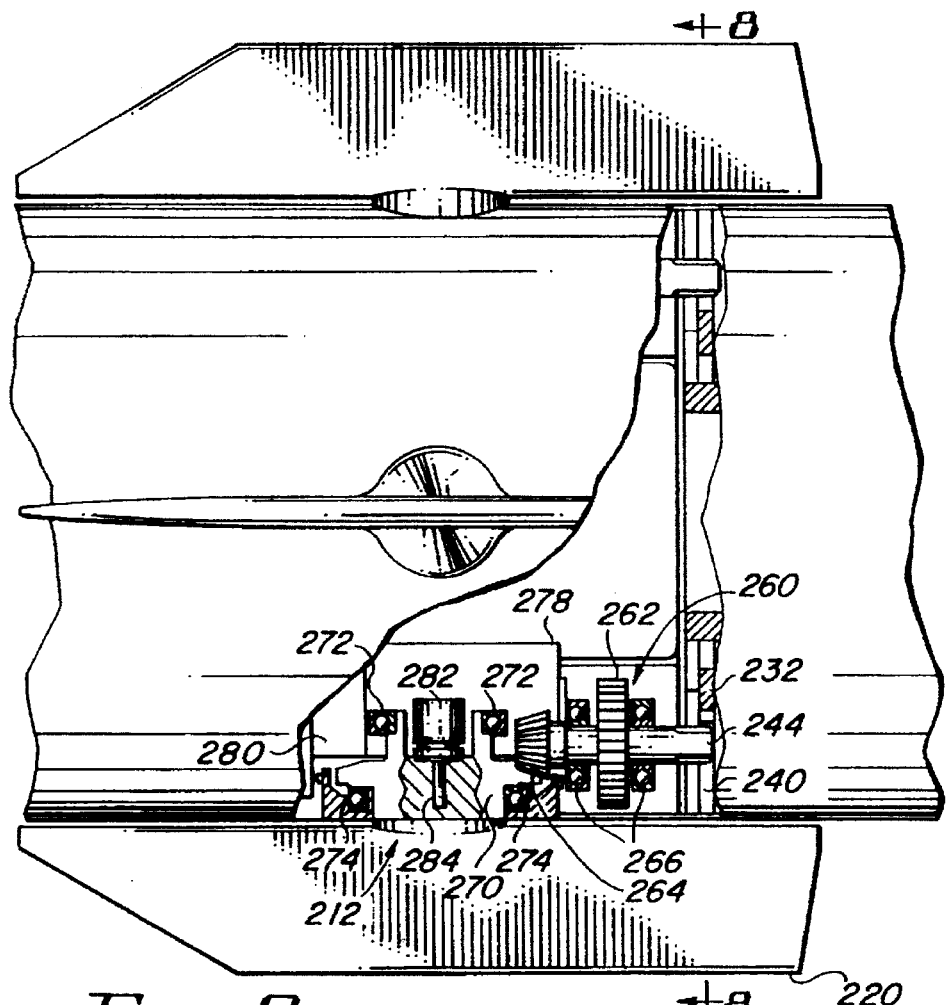

FIG. 8 is a schematic diagram illustrating the drive elements of the combination steering control system 200 and corresponds to a sectional view taken along the line 8—8 in FIG. 9, looking in the direction of the arrows. A pair of orthogonally oriented yoke plates 230, 232 are shown bearing against the steerable nozzle 224 to control thrust direction in a manner similar to that of the prior art arrangement depicted in FIGS. 5 and 6. A principal difference from that device is that each of the yoke plates 230, 232 is free to move in response to rotational forces applied at both opposite ends thereof, rather than being pivotably anchored at one end as indicated in FIG. 5.

The details of the yoke plate drive assemblies are shown for the unit A at the position of the aerofin assembly 212. A rack and pinion gear assembly 236 comprises a curved rack gear 238 on a rack carrier 240. The carrier 240 is curved on its outer surface to match the curvature of the missile shell 242 and is adapted to slide circumferentially relative to the missile shell 242 as it is driven by the spur gear 244. The corresponding end of the yoke plate 232 is provided with a U-shaped recess 246 in which the rack carrier 240 is mounted, bearing against side walls 248 of the recess 246. This arrangement is repeated at the other three aerofin stations B, C and D located at 90 degree spacings about the missile.

In FIG. 8, the broken line outline 250 indicates the typical launcher envelope for such a system. It will be apparent that, as the pinion gear 244 is driven to rotate, it moves the rack carrier 240 either clockwise or counterclockwise, depending upon the direction of rotation of the pinion gear 244. Corresponding movement of the yoke plate 232 moves the nozzle 224 off axis, thereby changing the direction of the thrust to effect steering of the missile.

FIG. 9 illustrates schematically the details of the combination drive arrangement for an aerofin 212 and a yoke plate 232 in accordance with the invention. This view shows the combined aerofin and TVC dual pinion gear 260 having a central drive gear 262 mounted on a common shaft with spur gear 244 and a bevel pinion gear 264. The shaft of the dual pinion gear 260 is mounted in bearings 266.

A bevel gear 270 is directly connected to the aerofin 220 and is coupled to the bevel pinion gear 264. Gear 270 is mounted for rotation in upper and lower bearings 272, 274. An electric motor 280 has an output shaft coupled to drive the gear 262 which in turn produces rotation of both the bevel gear 270 and the pinion gear 244, thus driving both the aerofin 220 and the rack 240. This in turn drives the yoke plate 232. A feedback transducer 282 is connected to the aerofin bevel gear 270 by a shaft 284, thereby providing aerofin position data for the control system of the drive arrangement 200. The coupling between the motor 280 and the gear 262 is represented by the block 278. This preferably incorporates a speed reducing gear train to transform the motor's relatively high speed and low torque into low speed and high torque. Such speed reducers are known in the art; details are omitted from FIG. 9 for simplicity.

Figure 10A:
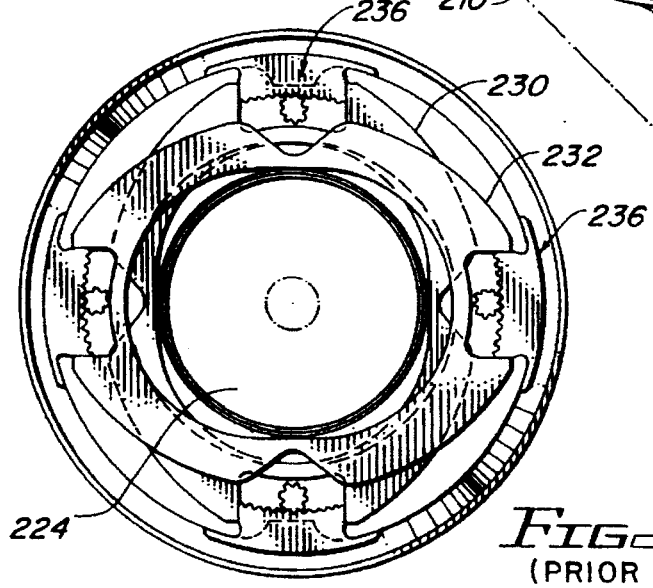
Figure 10B:
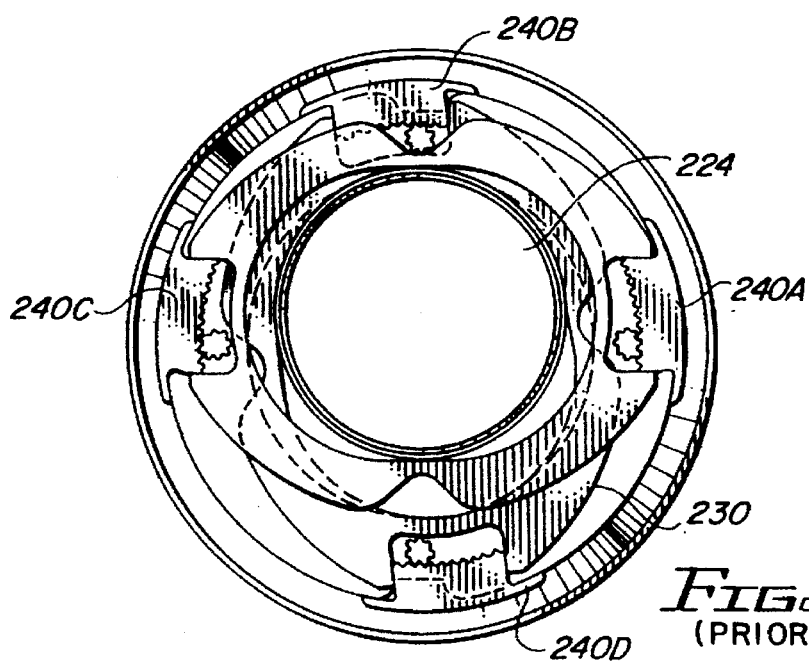

FIG. 10A is a schematic diagram, like that of FIG. 8, showing the rack and pinion drive arrangement and the corresponding yoke plates 230, 232 with nozzle 224 in neutral position. FIG. 10B is a similar view showing the racks driven to their extreme positions. Rack carriers 240A and 240C have been driven upward, thereby directing the nozzle 224 off axis to an upper position. Similarly, the aerofins 220 at positions A and C (see FIG. 8) would be rotated correspondingly to drive the missile in the same direction of flight as results from the shifting of the nozzle 224. The rack carriers 240B, 240D, however, are shown driven in opposite directions from each other; that is, the rack carrier 240B is driven to the left while 240D is driven to the right. This condition corresponds to the rotation of the aerofins at stations B and D (FIG. 8) in opposite directions, which would produce a roll motion of the missile. Moving the corresponding rack carriers 240B and 240D as shown results in the nozzle 224 being unaffected, since the yoke plate 230 does not move off axis as the rack carriers 240B and 240D are moved; the yoke plate 230 merely rotates with the rack carriers 240B, 240D. Thus, missile roll maneuvers can be effected without shifting the nozzle off center. However, when the aerofins are driven to change the direction of the missile relative to its flight trajectory, the depicted arrangement also produces a corresponding shift of the nozzle direction to direct the thrust in accordance with the shift of the aerofins.

Although there have been described hereinabove various specific arrangements of a mechanism for thrust vector control using multiple nozzles in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A rocket nozzle directing device for controlling a missile in flight comprising:
   a first yoke plate;
   a second yoke plate;
   first mounting means for mounting said first yoke plate for movement in a first plane transverse to the longitudinal axis of the missile;
   second mounting means for mounting said second yoke plate orthogonally to said first yoke plate for movement in a second plane transverse to said axis; and
   an interface yoke plate for moving at least one rocket nozzle, said interface yoke plate being coupled to said first and second yoke plates for controlled movement thereby.

2. The device of claim 1, wherein said first mounting means is comprised of first and second rack and pinion gear assemblies, the rack of said first assembly being disposed on a first carrier, the rack of said second assembly being disposed on a second carrier, said first and second carriers being driven to laterally displace said first yoke plate upon activation of at least one of said gear assemblies; and
   wherein said second mounting means is comprised of third and fourth rack and pinion gear assemblies, the rack of said third assembly being disposed on a third carrier, the rack of said fourth assembly being disposed on a fourth carrier, said third and fourth carriers being driven to laterally displace said second yoke plate upon activation of at least one of said third and fourth gear assemblies.

3. The device of claim 1, wherein said interface yoke plate is rotatable by said second yoke plate independently of movement of said first yoke plate.

4. The device of claim 3, wherein said interface yoke plate is adapted to control the thrust direction of a plurality of rocket nozzles.

5. The device of claim 1, wherein said interface yoke plate is coupled for lateral displacement by said second yoke plate.

6. The device of claim 5, wherein said interface yoke plate is adapted to control movement of a plurality of rocket nozzles in differing thrust angles.

7. The device of claim 1, wherein said interface yoke plate is decoupled from rotation of said first yoke plate but is coupled to said first yoke plate for lateral displacement thereby.

8. The device of claim 1, wherein each of said first and second yoke plates has a plurality of interior edges defining a central opening and wherein said interface yoke plate extends into the openings of said first and second yoke plates and has a plurality of peripheral surfaces for engaging corresponding interior edges of said first and second yoke plates.

9. The device of claim 8, wherein the top and bottom surfaces of the interface yoke plate are generally planar flats positioned to bear against corresponding generally straight top and bottom interior edges of said second yoke plate in order to produce rocket nozzle movement relative to the yaw axis of the missile.

10. The device of claim 9, wherein the upper and lower interior edges of the second yoke plate extend beyond the side terminations of the top and bottom flats of the interface yoke plate to permit slidable movement of the interface yoke plate relative to said second yoke plate.

11. The device of claim 10, wherein the interface yoke plate extends into said first yoke plate opening and is provided with a pair of opposed side surfaces configured to engage corresponding interior side edges of said first yoke plate.

12. The device of claim 11, wherein the side edges of the first yoke plate are curved concave inwardly with a first predetermined radius of curvature and wherein the side surfaces of the interface yoke plate are curved concave inwardly with a second predetermined radius of curvature being less than said first radius of curvature in order to permit rotation of the interface yoke plate relative to the missile central axis independently of said first yoke plate.

13. The device of claim 12, wherein the opposed curved side surfaces of the interface yoke plate are configured to establish sliding contact with corresponding interior edges of the first yoke plate, thereby permitting a combined rotation of the interface yoke plate in response to rotation of the second yoke plate concurrently with translational movement of the interface yoke plate upon translational movement of the first yoke plate relative to the missile yaw axis.

14. The device of claim 1, wherein the interface yoke plate is coupled to a pair of pivoted rocket nozzles which are pivotable to assume different angles of thrust in response to rotation of said interface yoke plate.

15. The device of claim 14, wherein the number of nozzles controllable by said interface yoke plate is four.

16. Apparatus for controlling the motion of a missile in flight about pitch, yaw and roll axes in response to applied command signals, said apparatus comprising:

a pair of rocket nozzles coupled to a rocket motor for delivering propulsive thrust to the missile, each rocket nozzle being pivotably mounted and capable of swiveling about a corresponding center of rotation;

an interface yoke plate mounted to engage said nozzles to control the thrust angles of the nozzles relative to the missile central axis; and a pair of actuator yoke plates, each being mounted to the missile for rotational movement and translational movement transversely of the missile axis in response to applied command signals, the actuator yoke plates being coupled to the interface yoke plate to produce translational movement thereof relative to the pitch and yaw axes of the missile as well as rotation of the interface yoke plate to direct the thrust from said rocket nozzles at different angles to produce motion about the missile roll axis.

17. The apparatus of claim 16, wherein said actuator yoke plates are oriented orthogonally to each other, one actuator yoke plate being mounted to develop translational movement relative to the yaw axis, the other actuator yoke plate being mounted to develop both translational movement relative to the pitch axis and rotational movement relative to the roll axis.

18. The apparatus of claim 17, wherein each of said actuator yoke plates includes contacting edges bearing against corresponding surfaces of said interface yoke plate to develop controlled movement thereof, relative to the pitch, yaw and roll axes of the missile.

19. The apparatus of claim 18, wherein the interface yoke plate is mounted to be slidable along contacting edges of one of said actuator yoke plates during translational movement of the interface yoke plate in response to corresponding movement of the other actuator yoke plate.

20. The apparatus of claim 19, wherein the interface yoke plate has planar top and bottom surfaces slidably mating with corresponding top and bottom straight edges of one of said actuator yoke plates for controlling movement of the interface yoke plate relative to the pitch axis, and wherein the interface yoke plate has rounded side surfaces positioned in slidable contact with corresponding curved edges of the other of said actuator yoke plates to develop translational movement relative to the yaw axis.

21. The apparatus of claim 20, wherein the interface yoke plate is slidable in rotational movement relative to said other actuator yoke plate in response to rotation of said one actuator yoke plate, thereby twisting said nozzles to direct their thrust about the missile roll axis.

22. The apparatus of claim 16, wherein the interface yoke plate is generally rectangular in outline, having straight opposed bearing surfaces engaging corresponding straight edges of the respective actuator yoke plates, the interface yoke plate being slidable relative to one of said actuator yoke plates in response to translational movement of the other actuator yoke plate; and wherein the interface yoke plate is rotatable to twist said nozzles to develop thrust about the missile roll axis in response to the joint rotational movement of both of said actuator yoke plates.

* * * * *